US006814909B1

(12) United States Patent
Sakurai et al.

(10) Patent No.: US 6,814,909 B1
(45) **Date of Patent: *Nov. 9, 2004**

(54) INDICATOR

(75) Inventors: Tadashi Sakurai, Kyoto (JP); Takanori Kume, Osaka (JP); Tatsuhiro Nagamatsu, Osaka (JP); Tsuyoshi Moriguchi, Chiba (JP); Miya Nakayama, Shiga (JP)

(73) Assignee: Sumitomo Chemical Company, Limited, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,200

(22) PCT Filed: Oct. 4, 1995

(86) PCT No.: PCT/JP95/02028

§ 371 (c)(1), (2), (4) Date: Apr. 3, 1998

(87) PCT Pub. No.: WO97/13235

PCT Pub. Date: Apr. 10, 1997

(51) Int. Cl.[7] ................................................ B29C 65/00

(52) U.S. Cl. .................. 264/41; 264/288.4; 264/288.8; 264/289.6; 264/291; 524/425; 524/427; 524/493; 524/494

(58) Field of Search ................................ 424/409, 486, 424/487; 524/493, 494, 425, 427; 264/41, 288.4, 289.6, 288.8, 291

(56) References Cited

U.S. PATENT DOCUMENTS

| | | | | | |
|---|---|---|---|---|---|
| 2,249,867 | A | * | 7/1941 | Snelling | 73/335.08 |
| 3,375,208 | A | * | 3/1968 | Duddy | 521/28 |
| 3,418,079 | A | * | 12/1968 | Rey et al. | 422/56 |
| 3,486,946 | A | * | 12/1969 | Duddy | 156/280 |
| 3,551,538 | A | * | 12/1970 | Yamamoto et al. | 264/49 |
| 3,629,233 | A | * | 12/1971 | Fujita et al. | 536/7.5 |
| 3,697,367 | A | * | 10/1972 | Schwarz | 428/357 |
| 3,698,871 | A | * | 10/1972 | Brennan | 422/53 |
| 3,723,064 | A | * | 3/1973 | Liotta | 436/66 |
| 3,758,661 | A | * | 9/1973 | Yamamoto et al. | 264/230 |
| 3,816,575 | A | * | 6/1974 | Susuki et al. | 521/61 |
| 3,901,769 | A | * | 8/1975 | Takatori et al. | 204/2 |
| 3,921,636 | A | * | 11/1975 | Zaffaroni | 128/260 |
| 3,963,442 | A | * | 6/1976 | Bullard et al. | 23/253 TP |
| 4,246,351 | A | * | 1/1981 | Miyake et al. | 435/182 |
| 4,613,441 | A | * | 9/1986 | Kohno et al. | 210/500.36 |
| 4,921,636 | A | | 5/1990 | Traas | |
| 5,330,961 | A | * | 7/1994 | Takeyama et al. | 503/227 |
| 5,356,853 | A | * | 10/1994 | Ueno et al. | 503/227 |
| 5,475,515 | A | | 12/1995 | Yoshinaga et al. | |
| 5,476,652 | A | * | 12/1995 | Chinuki et al. | 424/78.01 |
| 5,491,188 | A | * | 2/1996 | Ikeda et al. | 524/229 |

FOREIGN PATENT DOCUMENTS

| | | | |
|---|---|---|---|
| EP | 0567018 | A | 10/1993 |
| JP | 61-72701 | A | 4/1986 |
| JP | 01156695 | A | 6/1989 |
| JP | 5-303086 | A | 11/1993 |

* cited by examiner

*Primary Examiner*—Judy M. Reddick
(74) *Attorney, Agent, or Firm*—Birch, Stewart, Kolasch & Birch, LLP

(57) ABSTRACT

An indicator comprising a porous resin material, and a liquid retained in the pores of the porous resin material, in which the whiteness of the porous resin material is at least 80, and the whiteness of the porous resin material is at least 20 larger than that of the indicator. This indicator displays information such as a period through the change of a color tone, and the like, well maintains the displaying properties, and suffers from less variation of displayed periods.

11 Claims, 2 Drawing Sheets

INDICATOR

This application claims the benefit under 35 U.S.C. §371 of prior PCT International Application No. PCT/JP95/02028, which has an International filing date of Oct. 4, 1995, which designated the United States of America, the entire contents of which are hereby incorporated by references.

FIELD OF THE INVENTION

The present invention relates to an indicator for displaying information such as a period of time, through the change of a color tone, and the like.

PRIOR ART

A period-indicating element is known, which utilizes a phenomenon that, when a liquid is applied onto a frosted glass plate or a water-writing paper sheet, the glass plate or paper sheet exhibits a different color from that prior to the application of the liquid (see JP-B-63-13545). However, the liquid is retained only on the surface of the glass plate or paper sheet according to the prior art element, and thus the evaporation of the liquid or migration of the liquid to other material starts while the time period-indicating element is being transported, or it is stored in a sealed state prior to use. Accordingly, the amount of the retained liquid decreases prior to the time use of the period-indicating element, so that the element is discolored during the storage, or the displayed period varies. In addition, since the amount of the retained liquid is small, the effects of an insecticide or an aromatic may not be sufficiently exhibited, when it is used as a liquid.

SUMMARY OF THE INVENTION

An object of the present invention is to provide an indicator which has good storage properties and suffers from less variation in displaying a time period during use.

The present invention relates to an indicator comprising a porous resin material, and a liquid retained in the pores of said porous resin material, which satisfies the following relationships:

$W_1 \geqq 80$ and $(W_1 - W_2) \geqq 20$ wherein $W_1$ is a whiteness of the porous resin material, and $W_2$ is a whiteness of the indicator.

The indicator herein used means an element which indicates, for example, a period of time, and can be used in various fields as explained below.

DETAILED DESCRIPTION OF THE INVENTION

Figure 1:
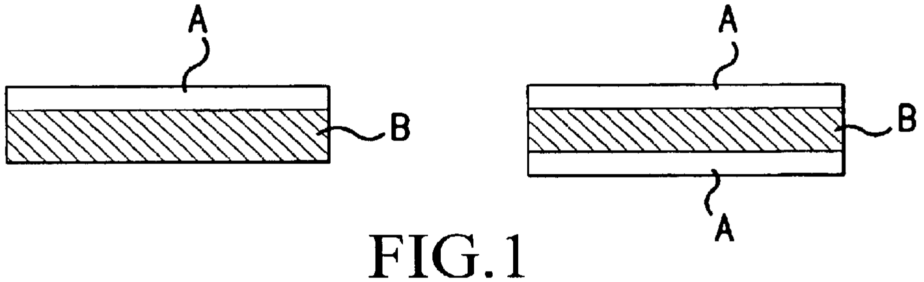
FIG. 1 is a cross section of one application embodiment of an indicator according to the present invention.

In the present invention, a porous resin material has a whiteness of at least 80. Herein, the whiteness of the porous resin material means a whiteness W according to JIS L 0803, which is measured in a state containing no liquid.

Kinds of resins used for the porous resin material are not limited. Examples of the resins are polyolefin resins, polyamide resins, polyacetal, polyester resins, fluororesins, polyvinyl chloride resins, polystyrene resins, methacrylate base resins, polycarbonates, polysulfones, polyurethane resins, and the like.

Among them, the thermoplastic resins, in particular, the polyolefin resins, are preferred.

Examples of the polyolefin resins are α-olefin homopolymers such as low density polyethylene, high density polyethylene, polypropylene, polybutene, etc.; copolymers of ethylene with organic carboxylic acid derivatives having an ethylenically unsaturated bond such as copolymers of ethylene with vinyl acetate and/or (meth)acrylic acid; copolymers of ethylene with at least one α-olefin having 3 to about 18 carbon atoms; copolymers of propylene with ethylene and/or butene-1; and the like.

A porous resin material having a whiteness of at least 80 may be prepared from a selected resin by any conventional method. For example, a porous resin material can be prepared by a method comprising dissolving a resin and a low molecular weight compound in a solvent, evaporating the solvent off to obtain a cast film, and extracting the low molecular weight compound from the cast film; a method comprising foaming a resin with a foaming agent or by gas foaming; a method comprising stretching a composition comprising at least two thermoplastic resins and then extracting one of the thermoplastic resins with a solvent; and a method comprising stretching a molded article which has been obtained by molding a composition containing a thermoplastic resin and a filler.

Among these methods, the method comprising stretching a molded article containing a thermoplastic resin and a filler is preferable, since it provides a porous resin material having good liquid-retaining properties.

A porosity is preferably at least 0.01 cc/g, more preferably at least 0.1 cc/g, in view of the liquid-retention of the obtained porous resin.

In this case, the amounts of the thermoplastic resin and filler are so selected that a volume percentage of the filler is between about 5 and 60%, preferably between 15 and 40%, more preferably between 23 and 35%, in view of the porosity of the obtained porous resin material. A volume percentage can be calculated by converting the weight percentage of a filler to the volume percentage using specific gravities of the thermoplastic resin and filler.

The average particle size of the filler is, for example, 100 μm or less, preferably between 0.05 and 10 μm.

A molded article comprising a thermoplastic resin and a filler may be produced by a known method, for example, by mixing or kneading the thermoplastic resin and filler using a roll or Banbury kneader or a single- or twin-screw extruder, and then extrusion molding the mixture.

Preferably, the filler satisfies the following relationship of refractive indexes (1) since a large degree of color change of the indicator can be achieved:

$$\text{Refractive index of thermoplastic resin/Refractive index of filler} = 0.89\text{–}1.13 \quad (1)$$

This refractive index ratio is preferably between 0.98 and 1.02.

Kinds of the filler are not limited. Examples of the filler are inorganic fillers such as calcium carbonate, silica, silicate, hydrotalcite compounds, lithium-aluminum complex hydroxide, sodium chloride, etc.; and organic fillers such as nylon powder, polycarbonate powder, polystyrene powder, crosslinked polystyrene powder, polypropylene powder, polymethyl methacrylate powder, poly-4-methylpentene-1 powder, etc.

When a polyolefin resin is used as the resin, inorganic fillers are preferred. In particular, an inorganic filler is preferably selected from hydrotalcite compounds and lithium-aluminum complex hydroxide.

Examples of the hydrotalcite compounds are compounds of the formula:

$$[M^{2+}_{1-x}M^{3+}_{x}(OH)_2]^{x+}[A_1{}^{n-}{}_{x/n}.mH_2O]^{x-}$$

wherein $M^{2+}$ is a divalent metal cation, $M^{3+}$ is a trivalent metal cation, $A_1{}^{n-}$ is a n-valent anion, x is a number larger than 0 and not larger than 0.33 ($0<x\leqq 0.33$), and m is a number of between 0 and 2 ($0\leqq m\leqq 2$).

Examples of the divalent metals are magnesium, manganese, iron, cobalt, nickel, copper, zinc, etc. Examples of the trivalent metal are aluminum, iron, chromium, cobalt, indium, etc. Examples of the n-valent anion are hydroxide ion, carbonate ion, fluoride ion, chloride ion, bromide ion, nitrate ion, sulfate ion, etc. A n-valent anion may be substituted with an organic anion.

Examples of the lithium-aluminum complex hydroxide are compounds of the formula:

$$Li^{+}(Al^{3+})_2(OH)_6\cdot(A_2{}^{n-})_{1/n}.mH_2O$$

wherein $A_2{}^{n-}$ is a n-valent anion, n is an integer of 1 to 4, and m is a number of between 0 and 3 ($0\leqq m\leqq 3$).

The kind of a n-valent anion is not limited.

Among the above fillers, the hydrotalcite compounds are particularly preferred.

Conditions and methods for stretching the molded article are suitably selected according to the resin used for the porous resin material. For example, when polyethylene is used, the article is preferably stretched at a stretching temperature in the range between 30 and 130° C. at a stretching ratio of between 1.1 and 10. Examples of a stretching method are roll stretching, and the like.

A porous resin material having a whiteness of at least 80, preferably at least 90 can be obtained by the suitable selection of the amount of a filler, the thickness of a molded article, a stretching ratio, and the like.

The thickness of the porous resin article is not limited. For example, the thickness is between about 10 μm and 1 mm. In particular, the thickness of the porous resin article is usually between 10 and 500 μm, preferably between 50 and 500 μm, more preferably between 100 and 500 μm, since a large degree of color change of the indicator can be achieved.

A liquid is preferably selected so that the following relationship of refractive indexes (2) is satisfied:

$$\text{Refractive index of liquid/Refractive index of thermoplastic resin} = 0.867\text{–}1.13 \quad (2)$$

This refractive index ratio (2) is preferably between 0.96 and 1.04, in view of the whiteness difference between the indicator and the porous resin material, and also the large color change of the indicator.

The kind of the liquid is not limited. Any liquid may be used, insofar as it is liquid at a service temperature, the porous resin material is not dissolved in it, and it can be evaporated or eluted from the porous resin material. The liquid is suitably selected depending on the applications of the display, display periods, application methods, and the like.

The liquid may be at least one organic compound, or at least one active ingredients such as fungicides, bactericides, herbicides, plant-growth regulators, pheromones, insecticides, insect-growth regulators, repellents, aromatics, medicines, and the like.

The liquid may be a solution containing an active ingredient which is solid at the service temperature of the indicator. For example, when a solution of Permethrin (an insecticidal ingredient), which is solid at room temperature, dissolved in piperonyl butoxide (a compound for enhancing the effect of an insecticidal ingredient) is used in an indicator to be used at room temperature, an insecticidal effect can be attained in addition to the indicator function.

Specific examples of the organic compounds and active ingredients are alcohols (e.g. ethanol, isopropanol, etc.); ketones (e.g. methyl ethyl ketone, etc.), ethers (e.g. tetrahydrofuran, dioxane, etc.); aliphatic hydrocarbons (e.g. hexane, decane, kerosine, liquid paraffin, etc.); aromatic hydrocarbons (e.g. toluene, xylene, etc.); esters (e.g. ethyl acetate, butyl acetate, benzyl acetate, ethyl myristate, dimethyl phthalate, diethyl phthalate, dibutyl phthalate, dioctyl phthalate, benzyl benzoate, etc.); halogenated hydrocarbons (e.g. dichloromethane, dichloroethane, etc.); vegetable oils (e.g. hinoki oil, hiba oil, soybean oil, rapeseed oil, salad oil, etc.); aromatic liquids (e.g. lemon grass, orange oil, lavender oil, mustard oil, etc.), phenols (e.g. resorcinol, cresol, etc.); phenolic carboxylic acids (e.g. salicylic acid, etc.); alcohols (e.g. benzyl alcohol, methanol, etc.); fungicidal and bactericidal compounds (e.g. p-chloro-m-xylonol, o-phenylphenol, 3-meethyl-isopropylphenol, 3-aceto-6-methyl-2-pyronone, benzoic acid, hydroxybenzoates, etc.); insecticidal ingrediants such as pyrethroids (e.g. Permethrin, Allethrin, d-Allethrin, dd-Allethrin, Prallethrin, Cyphenothrin, d-Phenothrin, d-Resmethrin, Empenthrin, Fenvalerate, Fenpropathrin, Cyhalothrin, Cyfluthrin, Ethofenprox, Tralomethrin, Esbiothrin, Transfluthrin, Terallethrin, etc.), organic phosphorus compounds (e.g. Fenitrothion, Dichlrorovos, Naled, Fenthion, Cyanophos, Chlorpyrifos, Diazinon, Calchlophos, Salithion, etc.), carbamates (e.g., methoxydiazone, Propoxur, BPMC, Carbaryl, etc.), and phenylpyrazoles (e.g. Fipronil, etc.); insect-growth regulators (e.g. Pyroproxyfen, Methoprene, hydroprene, Diflubenzuron, Cyromazine, Phenoxycarb, Lufenuron, etc.); repellent-active ingredients (e.g. diethyltoluamide, etc.), and the like.

For retaining a liquid on or in a porous resin material, a method comprising dipping a porous resin material in a liquid, a method comprising applying a liquid on the surface of a porous resin material, and the like are exemplified. When a porous resin material is produced by stretching a molded article which comprises a thermoplastic resin and a filler, the molded article, which has been dipped in a liquid or applied with a liquid, is stretched. Alternatively, a liquid is compounded in a thermoplastic resin by kneading or the like, and a molded article containing the liquid is stretched.

Accordingly, an indicator, which retains a liquid in a porous resin material having a whiteness of at least 80, and has a whiteness that is at least 20 smaller than that of the porous resin material, is obtained. The whiteness of the indicator means a whiteness W according to JIS L 0803, like the whiteness of the porous resin material, and is measured while retaining the liquid in the porous resin material.

The indicator of the present invention can be handled more easily than the conventional displaying elements which carry a liquid on their surface layer, since the liquid is less adhered to other material which is in contact with the indicator surface.

The content of the liquid in the porous resin material (liquid retention) depends on the porosity of the porous resin material. The indicator of the present invention can retain at least 15 wt. % of the liquid based on the weight of the porous resin material.

When the indicator has a whiteness which is at least 40 smaller than that of the porous resin material, the period display can be further clearly identified.

The indicator having a whiteness which is at least 40 smaller than that of the porous resin material can be prepared by selecting a thermoplastic resin, a filler and a liquid so that their refractive indexes satisfy the following relationships:

Refractive index of thermoplastic resin/Refractive index of filler=0.98–1.02

Refractive index of liquid/Refractive index of thermoplastic resin=0.867–1.13, compounding a filler in an amount of, for example, 15 to 40 vol. %, preferably 20 to 30 vol. %, and suitably adjusting stretching conditions.

Specific examples of such a combination of a thermoplastic resin, a filler and a liquid are as follows:

Linear low density polyethylene (SUMIKATHENE-L FA201-0 available from Sumitomo Chemical Co., Ltd.)/hydrotalcite compound (DHT-4A available from KYOWA Chemical Industries, Ltd.)/Empenthrin;

Linear low density polyethylene (SUMIKATHENE-L FA101-0 available from Sumitomo Chemical Co., Ltd.)/hydrotalcite compound (DHT-4A available from KYOWA Chemical Industries, Ltd.)/Empenthrin;

Branched low density polyethylene (SUMIKATHENE F208-0 available from Sumitomo Chemical Co., Ltd.)/hydrotalcite compound (DHT-4A available from KYOWA Chemical Industries, Ltd.)/Empenthrin;

Linear low density polyethylene (SUMIKATHENE-L FA101-0 available from Sumitomo Chemical Co., Ltd.)/hydrotalcite compound (DHT-4A available from KYOWA Chemical Industries, Ltd.)/Diethyltoluamide;

Branched low density polyethylene (SUMIKATHENE F208-0 available from Sumitomo Chemical Co., Ltd.)/hydrotalcite compound (DHT-4A available from KYOWA Chemical Industries, Ltd.)/Diethyltoluamide;

Linear low density polyethylene (SUMIKATHENE-L FA101-0 available from Sumitomo Chemical Co., Ltd.)/hydrotalcite compound (DHT-4A available from KYOWA Chemical Industries, Ltd.)/Empenthrin and dibutyl phthalate (50:50 by weight);

Branched low density polyethylene (SUMIKATHENE F208-0 available from Sumitomo Chemical Co., Ltd.)/hydrotalcite compound (DHT-4$\mu$available from KYOWA Chemical Industries, Ltd.)/Empenthrin and dibutyl phthalate (50:50 by weight);

Linear low density polyethylene (SUMIKATHENE-L FA101-0 available from Sumitomo Chemical Co., Ltd.)/hydrotalcite compound (DHT-4A available from KYOWA Chemical Industries, Ltd.)/dibutyl phthalate;

Branched low density polyethylene (SUMIKATHENE F208-0 available from Sumitomo Chemical Co., Ltd.)/hydrotalcite compound (DHT-4A available from KYOWA Chemical Industries, Ltd.)/EMPENTHRIN/dibutyl phthalate.

Among the above exemplified combinations, those containing the hydrotalcite compound and EMPENTHRIN are preferred in view of the refractive index ratios defined by the above relationships (1) and (2).

The porous resin material may optionally contain components for enhancing stretchability, dispersants, light-stabilizers, heat-stabilizers, moisture-absrobents, deodorants, fragrances, pigments, dyes, and the like, insofar as the effects of the present invention are not impaired.

The resin may be a mixture of two or more thermoplastic resins which have compatibility with each other. Also, two or more fillers may be used in combination.

In such cases, any combination of each thermoplastic resin, each filler and a liquid preferably satisfies the above relationships (1) and (2).

That is, thermoplastic resins, fillers and a liquid are selected so that a ratio of a refractive index of a thermoplastic resin i to that of a filler j, and a ratio of a refractive index of a liquid to that of a thermoplastic resin i (in which i is an integer of 1 to n, and j is an integer of 1 to m, where n and m are the numbers of the thermoplastic resins and fillers, respectively) are in the above ranges, respectively.

A preferable example of a combination of two or more thermoplastic resins is a resin composition comprising at least 60 wt. % of a copolymer of ethylene and at least one α-olefin having 4 to 12 carbon atoms based on the total weight of thermoplastic resins. A more preferable example is a resin composition comprising 60 to 95 wt. % of a copolymer of ethylene and at least one α-olefin having 4 to 12 carbon atoms and 40 to 5 wt. % of branched low density polyethylene. Such a resin composition can easily provide a porous resin material having good strength and uniformly formed pores by stretching a molded article.

Examples of a copolymer of ethylene and at least one α-olefin having 4 to 12 carbon atoms are linear low density polyethylene (SUMIKATHENE-L FA201-0 available from Sumitomo Chemical Co., Ltd.), linear low density polyethylene (SUMIKATHENE-L FA101-0 available from Sumitomo Chemical Co., Ltd.), and the like.

The use method of the indicator of the present invention is not limited, and the indicator can be used in various ways according to its applications.

For example, an indicator is hung in a wardrobe for evaporating the liquid, an indicator is soaked in a solution under specific conditions such as in a water tank for dissolving the liquid in the solution, or a material, which absorbs a liquid, is in contact with or adhered to an indicator for migrating the liquid from the indicator to the material.

A lapsed time can be known since the liquid-retaining part of the indicator changed from a state with a low whiteness (transparent) to a state with a high whiteness (white) as the time lapses.

As shown in FIG. 1, when a coloring layer B (other than white) is formed on at least one surface of a transparent indicator A of the present invention, the color of the indicator changes from the color of the colored layer to white as the time lapses, and thus the period of lapsed time can be recognized. The expiration of the period can be further clearly recognized, when the thickness of the indicator A is selected so that the indicator hides the color of the colored layer after the indicator A is changed to the high whiteness state (white). The thickness of such an indicator A may be, for example, 30 $\mu$m or more, although this thickness depends on the color of the colored layer, and a desired degree of color tone change.

For example, the word "REPLACE" may be printed on the surface of the indicator A using an ink having the same color as the colored layer, or the word "IN USE" may be printed on the colored layer with a white ink.

Figure 2:
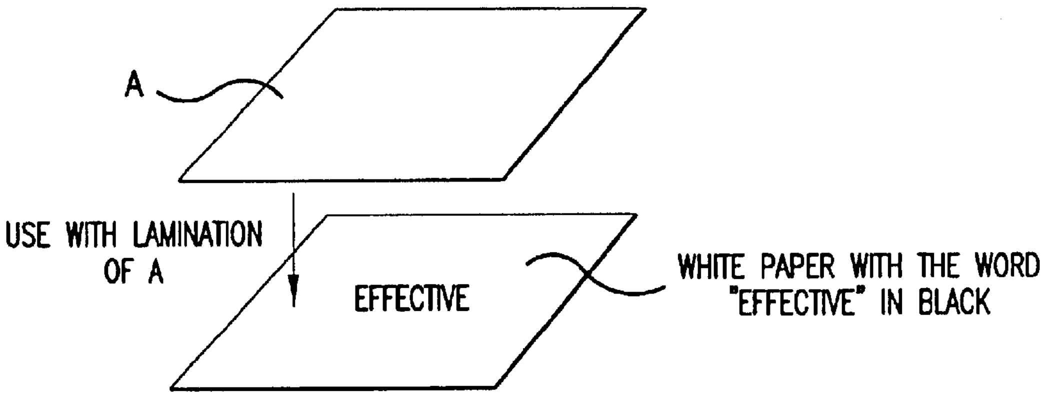
FIG. 2 is a perspective view of another application embodiment of an indicator according to the present invention.

As shown in FIG. 2, when a white or bright substrate, which carries the word "IN USE" or "EFFECTIVE" printed with a black or dark ink on at least one of its surfaces, may be used, the word becomes unreadable as the indicator A changes from the low whiteness state (transparent) to the high whiteness state (white) over time, and thus the lapsing of the service life of a product can be recognized.

Figure 3:
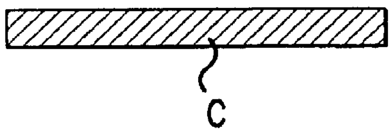
FIG. 3 is a cross section of a colored indicator.

As shown in FIG. 3, when an indicator C of the present invention is colored other than white, the color of the indicator changes to a lightly colored white state, or a white state from the original color. The word "REPLACE" may be printed on the surface of the indicator with the same color as the indicator C, or the word "IN USE" may be printed on the surface of the indicator with a white ink.

Figure 4:
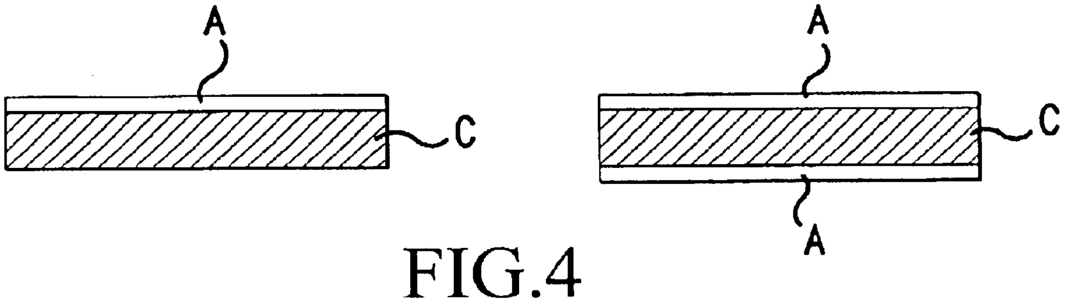
FIG. 4 is a cross section of one application embodiment of a colored indicator.

As shown in FIG. 4, when a transparent indicator A of the present invention is placed on at least one surface of an indicator C of the present invention which has been colored other than white, the indicator C changes from its original color to white as the time lapses, and thus the period of lapsed time can be recognized. In this case, not only the indicator A but also the indicator C change to white, and thus the change of color tone is further clear.

The thickness of the indicator A may be about 3 $\mu$m or more, although this thickness depends on the color of the colored layer, and the desired degree of color tone change. The word "REPLACE" may be printed on the surface of the indicator A with the same color as the indicator C, or the word "IN USE" may be printed on the surface of the indicator A with a white ink.

Figure 5:
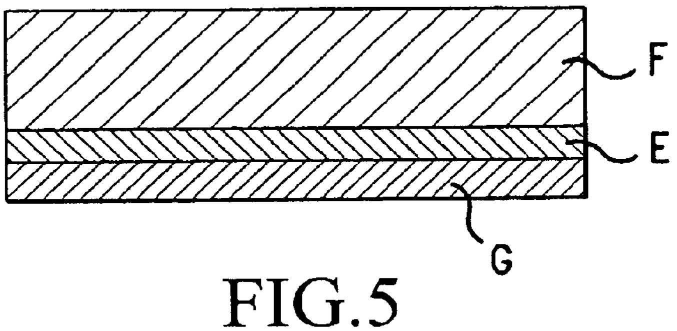
FIG. 5 is a cross section of a further application embodiment of an indicator.

As shown in FIG. 5, an indicator E of the present invention can be laminated on a dispenser F, which contains a liquid including an active ingredient, and a barrier layer G. The indicator of the present invention may be used in combination with a control-release layer which control the releasing rate of the liquid in a preferable range, or a barrier layer which suppresses the release of the liquid.

Such layers may be formed on the surface of the indicator by dry lamination or extrusion lamination since the indicator of the present invention retains the liquid in the pores of the porous resin material.

The control-release layer may be a layer made of at least one polymer selected from the group consisting of α-olefin homopolymers (e.g. low density polyethylene, high density polyethylene, polypropylene, polybutene, etc.); copolymers of ethylene with at least one α-olefin having 3 to 18 carbon atoms; copolymers of propylene with ethylene and/or butene-1; and copolymers of ethylene with vinyl acetate and/or an organic acid derivative having an ethylenically unsaturated bond (e.g. acrylates, methacrylates, etc.).

The barrier layer may be any layer having a low permeability against the used liquid, and can be a glass plate, a metal foil such as an aluminum foil, a metal plate, a layer made of at least one polymer selected from ethylene-vinyl alcohol copolymer, nylon, polyethylene terephthalate, polyvinylidene chloride, and the like, although the type of the barrier layer depends on the kind of the used liquid.

The use of the indicator of the present invention is not limited. For example, it can be used for indicating an effective period (for example, several hours to several years) of a product having a limited effective period, or a cooking time of a cupped instant noodle.

Examples of the product having the limited effective period are herbicide sheets, insecticide sheets, pheromone formulations, analgesics, percutaneous therapeutic agents such as nicotine, bacteriocidal sheets, rust-preventing sheets, perfumes for use in cars or indoors, mosquito-repellent mats, mosquito-repellent liquids, sustained release drugs comprising a resin which contains insecticidal ingredients, such as flea collars for animals, insecticides for clothes used in wardrobes, which comprises a substrate (e.g. a paper sheet or pulp) carrying applied or impregnated insecticidal ingredients, deodorants used in refrigerators or shoe cupboards, food having the best use period, and the like.

The color changing period depends on the structure of the indicator and use conditions, and is in the range between several ten seconds and several years. An indicator suitable for the specific use can be selected by testing a color change period under the same conditions as the use conditions.

EFFECTS OF THE INVENTION

The indicator of the present invention has good storage properties such that the color change of the indicator hardly begins during the storage in a sealed state prior to the use, unlike the conventional indicators, since it retains a liquid in a porous part. Furthermore, the variation of the displayed period in the use is minimum. In addition, it can easily retain a large amount of a liquid, for example, 15 wt. % or more. Thus, when insecticides or perfumes are used as liquids, the indicator of the present invention can allow them to exhibit their effects sufficiently for a long time.

EXAMPLES

The present invention will be explained in detail by the following examples, which do not limit the scope of the present invention in any way.

The measurements were carried out as follows:

Whiteness:

A whiteness W according to JIS L 0803 was measured using a SM color computer (Model SM-4 manufactured by SUGA TEST INSTRUMENTS Co., Ltd.).

Retained amount of Liquid:

A retained amount of a liquid was measured by gas chromatography.

Color Change Period:

The color change was observed with an eye.

Example 1

A linear low density polyethylene (SUMIKATHENE-L FA201-0 available from Sumitomo Chemical Co., Ltd.) and a hydrotalcite compound (DHT-4A available from KYOWA Chemical Industries, Ltd.) were mixed so that the volume percentage of the hydrotalcite compound was 26%, and the mixture was kneaded with a kneader-extruder at 190° C. for 5 minutes, and extrusion molded at a resin temperature of 200° C. Thus, a sheet having a thickness of 0.55 mm was obtained.

This sheet was roll stretched uniaxially at a stretching temperature of 40° C. at a stretching ratio of 6, and heat set at 90° C. Thus, a porous resin material having a thickenss of 0.22 mm and a whiteness of 97.2 was obtained.

This porous resin material was cut in a 5 cm square, and dipped in Empenthrin (VAPORTHRIN available from Sumitomo Chemical Co., Ltd.), and ten indicators having a whiteness of 54.8 and an Empenthrin retention of 30 wt. % were obtained.

When five indicators were used in a drawer, they distinctly changed from transparent to white. The color change period was 180±7 days, and they exhibited the sufficient insecticidal effects during this period.

When five indicators were sealed with an EVAL film (available from KURARAY Co., Ltd.) and stored at 23° C. for 180 days, no color change was observed in any indicator.

Example 2

A thermoplastic resin composition of a linear low density polyethylene (SUMIKATHENE-L FA101-0 available from Sumitomo Chemical Co., Ltd.) and a branched low density polyethylene (SUMIKATHENE-L F208-0 available from Sumitomo Chemical Co., Ltd.) in a weight ratio of 8:2, and a hydrotalcite compound (DHT-4A available from KYOWA Chemical Industries, Ltd.) were mixed so that the volume percentage of the hydrotalcite compound was 26%, and the mixture was kneaded with a Banbury mixer at 140° C. for 5 minutes. Thus, a resin composition T was obtained.

Then, the resin composition T was supplied for outer and inner layers, while a dry blend of 95 wt. % of the resin composition T and 5 wt. % of a red COLOR MB (RED SPEM-1E120 available from SUMIKA COLOR Co., Ltd.) was supplied for an intermediate layer, and they were multilayer-extrusion molded at a resin temperature of 200° C. Thus, a sheet having a thickness of 0.24 mm was obtained.

This sheet was roll stretched uniaxially at a stretching temperature of 40° C. at a stretching ratio of 6.5, and heat set at 90° C. Thus, a porous resin material having a thickness of 0.12 mm and a whiteness of 90.3 was obtained.

This porous resin material was cut in a 5 cm square, and dipped in Empenthrin (VAPORTHRIN available from Sumitomo Chemical Co., Ltd.), and ten indicators having a whiteness of 24.3 and an Empenthrin retention of 33 wt. % were obtained.

When five indicators were hung in a room, which was adjusted at a temperature of 23° C. and a moisture of 40%, they distinctly changed from red to white. The color change period was 7±0.5 days, and they exhibited the sufficient insecticidal effects during this period.

When five indicators were sealed with an EVAL film (available from KURARAY Co., Ltd.) and stored at 23° C. for 180 days, no color change was observed in any indicator.

A PET (polyethylene terephthalate) substrate having an adhesive (SUPER STICK PET 38CLWP(3)PET3801 available from LINTEC CORPORATION) was laminated on one indicator. The indicator changed from red to white in 15 minutes after the lamination.

Example 3

A resin composition T was prepared in the same way as in Example 2. Then, a composition of 95 wt. % of the resin composition T and 5 wt. % of a red MB (RED SPEM-1E120 available from SUMIKA COLOR Co., Ltd.) was prepared and extrusion molded at a resin temperature of 200° C., and thus a sheet having a thickness of 0.24 mm was obtained.

This sheet was roll stretched uniaxially at a stretching temperature of 40° C. at a stretching ratio of 6.5, and heat set at 90° C. Thus, a porous resin material having a thickness of 0.12 mm and a whiteness of 82.5 was obtained.

This porous resin material was cut in a 5 cm square, and dipped in Empenthrin (VAPORTHRIN available from Sumitomo Chemical Co., Ltd.), and ten indicators having a whiteness of 24.9 and an Empenthrin retention of 29 wt. % were obtained.

When five indicators were hung in a room, which was adjusted at a temperature of 23° C. and a moisture of 40%, they distinctly changed from red to opaque white. The color change period was 7±0.5 days.

When five indicators were sealed with an EVAL film (available from KURARAY Co., Ltd.) and stored at 23° C. for 180 days, no color change was observed in any indicator.

Indicators each having a thickness of about twice larger than the thickness of the above indicator were prepared by the same method as described above except that the thickness of the sheet was changed to 0.48 mm. The porous resin material had a whiteness of 82.7, the indicators had a whiteness of 26.0, and the Empenthrin retention was 30 wt. %. These indicators were subjected to the same evaluation tests. Their color distinctly changed, and the color change period was 14±1 days, and the color did not change during the storage.

Example 4

Ten transparent red indicators were prepared by the same method as in Example 2 except that Diethyltoluamide was used as a liquid. The porous resin material had a whiteness of 90.3, the indicators had a whiteness of 20.0, and the Diethyltoluamide retention was 33 wt. %.

When five indicators were hung in a room, which was adjusted at a temperature of 23° C. and a moisture of 40%, they distinctly changed from red to opaque white. The color change period was 7±0.5 days.

When five indicators were sealed with an EVAL film (available from KURARAY Co., Ltd.) and stored at 23° C. for 180 days, no color change was observed in any indicator.

Indicators each having a whiteness of 22.0 and a liquid retention of 31 wt. % were prepared by the same method as described above except that a mixture of Empenthrin and Dibutyl phthalate in a weight ratio of 50:50 was used in place of Diethyltoluamide. These indicators were subjected to the same evaluation tests. Their color distinctly changed, and the color change period was 60±2 days, and the color did not change during the storage.

Example 5

A linear low density polyethylene (SUMIKATHENE-L FA101-0 available from Sumitomo Chemical Co., Ltd.) and calcium carbonate (WHITON SSB (RED) available from SHIRAISHI CALCIUM Co., Ltd.) were mixed so that the volume percentage of calcium carbonate was 22%, and the mixture was kneaded with a Banbury mixer at 140° C. for 5 minutes, and extrusion molded at a resin temperature of 240° C. Thus, a film having a thickness of 0.09 mm was obtained.

This film was roll stretched uniaxially at a stretching temperature of 40° C. at a stretching ratio of 6, and heat set at 90° C. Thus, a porous resin material having a thickness of 0.05 mm and a whiteness of 92.3 was obtained.

This porous resin material was cut in a 5 cm square, and dipped in Empenthrin (VAPORTHRIN available from Sumitomo Chemical Co., Ltd.), and five indicators having a whiteness of 72.3 and an Empenthrin retention of 20 wt. % were obtained.

When five indicators were hung in a room, which was adjusted at a temperature of 23° C. and a moisture of 40%, they changed their color in a period of 3±0.1 days. The degree of color change was smaller than those of the indicators of Examples 1 to 4.

Comparative Example

A porous resin material having a thickness of 0.05 mm and a whiteness of 96.0 was prepared by the same method as that of Example 5 except that titanium oxide (TAIPEK R101 available from DuPont; refractive index, 2.583; a ratio of the refractive index of the thermoplastic resin to that of titanium oxide=0.59) was used as a filler.

Indicators were produced by dipping the porous resin material in Empenthrin (VAPORTHRIN available from Sumitomo Chemical Co., Ltd.) in the same manner as in Example 5. The indicators had a whiteness of 94.0, and an Empenthrin retention of 20 wt. %.

The indicators were hung in a room, which was adjusted at a temperature of 23° C. and a moisture of 40%, but their color did not change.

Example 6

A resin composition T was prepared by the same method as that of Example 2, and inflation molded at a resin temperature of 190° C. Thus, a film having a thickness of 50 $\mu$m was obtained.

This film was roll stretched uniaxially at a stretching temperature of 40° C. at a stretching ratio of 6, and heat set at 90° C. Thus, a porous resin material having a thickness of 12 $\mu$m and a whiteness of 91.3 was obtained.

This porous resin material was cut in a 5 cm square, and dipped in dibutyl phthalate, and an indicator having a whiteness of 28.7 and a dibutyl phthalate retention of 25 wt. % was obtained.

A PET substrate having an adhesive (SUPER STICK PET 38CLWP(3)PET3801 available from LINTEC CORPORATION) was laminated on the indicator. The indicator distinctly changed from transparent to white in one minute after the lamination.

TABLE 1

| Example | Filler | | Porous material | | |
|---|---|---|---|---|---|
| No. | Kind[1)] | Vol. % | Thickness | $W_1$ | Liquid |
| 1 | A | 26 | 0.22 mm | 97.2 | Empenthrin |
| 2 | A | 24 | 0.12 mm | 90.3 | Empenthrin |
| 3(1) | A | 26 | 0.12 mm | 82.5 | Empenthrin |
| 3(2) | A | 26 | 0.24 mm | 82.7 | Empenthrin |
| 4(1) | A | 24 | 0.12 mm | 90.3 | Diethyltoluamide |
| 4(2) | A | 24 | 0.12 mm | 90.3 | Empenthrin/ dibutyl phthalate |
| 5 | B | 22 | 0.05 mm | 92.3 | Empenthrin |
| Comp. | C | 22 | 0.05 mm | 96.0 | Empenthrin |
| 6 | A | 26 | 0.012 mm | 91.3 | Dibutyl phthalate |

| Example | Indicator | | | Degree of |
|---|---|---|---|---|
| No. | $W_2$ | $W_1 - W_2$ | Liquid retention | color change[2)] |
| 1 | 54.8 | 42.4 | 30% | ○○○ |
| 2 | 24.3 | 66.0 | 33% | ○○○ |
| 3(1) | 24.9 | 57.6 | 29% | ○○ |
| 3(2) | 26.0 | 56.7 | 30% | ○○ |
| 4(1) | 20.0 | 70.3 | 33% | ○○○ |
| 4(2) | 22.0 | 68.3 | 31% | ○○○ |
| 5 | 72.3 | 20.0 | 20% | ○ |
| Comp. | 94.0 | 1.6 | 20% | X |
| 6 | 28.7 | 62.6 | 25% | ○○○ |

Notes:
[1)]A: DHT-4A (average particle size, 0.4 $\mu$m).
B: WHITON SSB (average particle size, 1.25 $\mu$m).
C: TAIPEK R101 (average particle size, 0.6 $\mu$m).
[2)]○○○: Large degree of color change.
○○: Middle degree of color change.
○: Small degree of color change.
X: No color change.

What is claimed is:

1. A time indicator comprising a porous resin material, and a liquid, which can be evaporated, retained in the pores of said porous resin material, which satisfies the following relationship:

$$W_1 \geqq 80 \text{ and}$$

$$(W_1 - W_2) \geqq 20$$

wherein $W_1$ is a whiteness of the porous resin material, and $W_2$ is a whiteness of the indicator, and wherein said porous resin material comprises a filler and a thermoplastic resin which satisfy the following relationship (1), and is prepared by stretching a molded article made of a composition having a volume percentage of the filler in the range between 15 and 40%, and said liquid satisfies the following relationship (2):

(1) a ratio of refractive index of thermoplastic resin to refractive index of filler =0.98–1.02; and (2) a ratio of refractive index of liquid to refractive index of thermoplastic resin=0.867–1.13.

2. The time indicator according to claim 1, wherein $W_1$ is at least 80, and $(W_1-W_2)$ is at least 40.

3. The time indicator according to claim 1, wherein the ratio of the relationship (2) is between 0.96 and 1.04.

4. A method for detecting a color change in an indicator which comprises a porous resin material and a liquid retained therein through the change of a color tone, comprising the steps of:

retaining a liquid in the pores of said porous resin material which satisfies the following relationship $$W_1 \geqq 80 \text{ and}$$

$$(W_1 - W_2) \geqq 20$$

in which $W_1$ is a whiteness of the porous resin material, and $W_2$ is a whiteness of the indicator, wherein said porous resin material comprises a filler and a thermoplastic resin satisfying the following relationship (1), and is prepared by stretching a molded article made of a composition having a volume percentage of the filler in the range between 15 and 40%, and said liquid satisfies the following relationship (2):

(1) a ratio of refractive index of thermoplastic resin to refractive index of filler=0.98–1.02; and (2) a ratio of refractive index of liquid to refractive index of thermoplastic resin 0.867–1.13, disposing said resin material retaining said liquid on the pores thereof in a condition that said liquid can be evaporated naturally or forcibly, and observing the change of a color tone of said indicator.

5. The method of claim 4, wherein $W_1$ is at least 80, and $(W_1-W_2)$ is at least 40.

6. The method of claim 4, wherein the ratio of the relationship (2) is between 0.96 and 1.04.

7. The time indicator according to claim 1, wherein the volume percentage of the filler in the composition of the molded article is in the range between 23 and 35%.

8. The method of claim 4, wherein the volume percentage of the filler in the composition of the molded article is in the range between 23 and 35%.

9. The time indicator according to claim 1, wherein the filler has an average particle size between 0.05 and 10 microns.

10. The method of claim 4, wherein the filler has an average particle size between 0.05 and 10 microns.

11. The time indicator according to claim 1, wherein said liquid comprises a fungicide, a bactericide, a herbicide, a plant-growth regulator, a pheromone, an insecticide, an insect-growth regulator, a repellant, an aromatic or a medicine.

* * * * *